(12) United States Patent
LoRicco

(10) Patent No.: US 11,261,739 B2
(45) Date of Patent: Mar. 1, 2022

(54) AIRFOIL WITH RIB COMMUNICATION

(71) Applicant: United Technologies Corporation, Farmington, CT (US)

(72) Inventor: Nicholas M. LoRicco, Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 495 days.

(21) Appl. No.: 15/863,441

(22) Filed: Jan. 5, 2018

(65) Prior Publication Data
US 2019/0211687 A1   Jul. 11, 2019

(51) Int. Cl.
*F01D 5/18* (2006.01)
*F01D 5/14* (2006.01)
*F01D 9/04* (2006.01)

(52) U.S. Cl.
CPC ............. *F01D 5/186* (2013.01); *F01D 5/147* (2013.01); *F01D 5/18* (2013.01); *F01D 5/183* (2013.01); *F01D 5/188* (2013.01); *F01D 5/189* (2013.01); *F01D 9/041* (2013.01); *F05D 2220/32* (2013.01); *F05D 2240/12* (2013.01); *F05D 2240/126* (2013.01); *F05D 2260/202* (2013.01)

(58) Field of Classification Search
CPC .......... F01D 5/186; F01D 5/147; F01D 9/041; F05D 2220/32; F05D 2240/12; F05D 2260/202
USPC ...................................................... 416/97 R
See application file for complete search history.

(56) References Cited

U.S. PATENT DOCUMENTS

| 3,628,880 | A | * | 12/1971 | Smuland ................... F01D 9/04 415/175 |
| 3,966,357 | A | * | 6/1976 | Corsmeier .............. F01D 5/189 416/97 R |
| 4,252,501 | A | | 2/1981 | Peill |
| 4,297,077 | A | | 10/1981 | Durgin et al. |
| 5,120,192 | A | | 6/1992 | Ohtomo et al. |
| 6,193,465 | B1 | * | 2/2001 | Liotta ..................... B23P 15/04 416/96 A |

(Continued)

FOREIGN PATENT DOCUMENTS

| EP | 1380724 | 1/2004 |
| EP | 3181823 | 6/2017 |

(Continued)

OTHER PUBLICATIONS

European Search Report for European Application No. 19150475.2, dated May 21, 2019.

*Primary Examiner* — Ninh H. Nguyen
*Assistant Examiner* — Jason Fountain
(74) *Attorney, Agent, or Firm* — Carlson, Gaskey & Olds, P.C.

(57) ABSTRACT

An airfoil for a gas turbine engine according to an example of the present disclosure includes a first cavity, a second cavity, and a rib extending from a suction sidewall to a pressure sidewall and separating the first cavity from the second cavity. The rib includes a central portion, a first edge portion extending from the pressure sidewall to the central portion, and a second edge portion extending from the suction sidewall to the central portion. The rib defines one or more communication openings from the first cavity to the second cavity in the first or second edge portion.

18 Claims, 6 Drawing Sheets

(56) References Cited

U.S. PATENT DOCUMENTS

| | | | | |
|---|---|---|---|---|
| 6,530,745 B2* | 3/2003 | Ciani | | F01D 5/186 415/115 |
| 6,742,991 B2* | 6/2004 | Soechting | | F01D 5/186 416/96 A |
| 7,497,655 B1* | 3/2009 | Liang | | F01D 5/189 415/1 |
| 7,625,180 B1* | 12/2009 | Liang | | F01D 5/186 29/889.2 |
| 7,789,625 B2* | 9/2010 | Liang | | F01D 5/189 416/97 R |
| 8,083,485 B2* | 12/2011 | Chon | | F01D 5/187 416/97 R |
| 9,759,072 B2* | 9/2017 | Gregg | | F01D 5/188 |
| 9,810,084 B1* | 11/2017 | Spangler | | F01D 5/186 |
| 10,006,295 B2* | 6/2018 | Spangler | | F01D 5/189 |
| 10,012,106 B2* | 7/2018 | Spangler | | F01D 9/02 |
| 10,557,375 B2* | 2/2020 | LoRicco | | F01D 25/12 |
| 2002/0064452 A1* | 5/2002 | Ciani | | F01D 5/186 415/115 |
| 2004/0009066 A1* | 1/2004 | Soechting | | F01D 5/186 416/96 R |
| 2008/0279697 A1* | 11/2008 | Liang | | F01D 5/189 416/97 R |
| 2009/0293495 A1* | 12/2009 | Correia | | F01D 5/186 60/782 |
| 2013/0052008 A1* | 2/2013 | Spangler | | F01D 5/186 416/1 |
| 2014/0037429 A1* | 2/2014 | Okita | | F01D 5/186 415/115 |
| 2014/0075947 A1 | 3/2014 | Gautschi et al. | | |
| 2015/0285096 A1* | 10/2015 | Spangler | | F01D 5/189 415/115 |
| 2016/0097286 A1* | 4/2016 | Tibbott | | F01D 5/188 415/1 |
| 2016/0102563 A1* | 4/2016 | Spangler | | F01D 5/189 415/115 |
| 2016/0251974 A1* | 9/2016 | Slavens | | F01D 25/12 60/806 |
| 2017/0356296 A1* | 12/2017 | Tibbott | | F01D 5/189 |

FOREIGN PATENT DOCUMENTS

| | | |
|---|---|---|
| GB | 2054749 | 2/1981 |
| WO | 2015023338 | 2/2015 |

* cited by examiner

AIRFOIL WITH RIB COMMUNICATION

BACKGROUND

A gas turbine engine typically includes a fan section, a compressor section, a combustor section and a turbine section. Air entering the compressor section is compressed and delivered into the combustion section where it is mixed with fuel and ignited to generate a high-energy exhaust gas flow. The high-energy exhaust gas flow expands through the turbine section to drive the compressor and the fan section. The compressor section typically includes low and high pressure compressors, and the turbine section includes low and high pressure turbines.

Components within a turbine section include features for communicating cooling air onto surfaces exposed to the gas flow and maintain temperatures within acceptable limits. Air for cooling is provided at pressures above those generated by the gas flow through a core flow path to prevent ingestion into interior cavities of components. Increasing airflow for cooling purposes can reduce overall engine operating efficiencies.

Turbine engine manufacturers continue to seek further improvements to engine performance including improvements to thermal, transfer and propulsive efficiencies.

SUMMARY

An airfoil for a gas turbine engine according to an example of the present disclosure includes a first cavity, a second cavity, and a rib extending from a suction sidewall to a pressure sidewall and separating the first cavity from the second cavity. The rib includes a central portion, a first edge portion extending from the pressure sidewall to the central portion, and a second edge portion extending from the suction sidewall to the central portion. The rib defines one or more communication openings from the first cavity to the second cavity in the first or second edge portion.

In a further embodiment according to any of the foregoing embodiments, a first baffle is disposed in the first cavity, and a second baffle is disposed in the second cavity.

In a further embodiment according to any of the foregoing embodiments, the first baffle and the pressure-sidewall bound a first passage, and the second baffle and the pressure sidewall bound a pressure-sidewall passage, and one or more communication openings are in the first edge portion and extend from the first passage to the pressure-sidewall passage.

In a further embodiment according to any of the foregoing embodiments, the airfoil for a gas turbine engine includes a plurality of flow disruptors in the first passage.

In a further embodiment according to any of the foregoing embodiments, the first baffle defines an interior channel and an outer channel between the first baffle and an inner surface of the first cavity, and the second baffle defines a second interior channel and a second outer channel between the second baffle and an inner surface of the second cavity.

In a further embodiment according to any of the foregoing embodiments, the outer channel includes the first passage and a second passage fluidly separated by a partition.

In a further embodiment according to any of the foregoing embodiments, the baffle provides a bleed opening in fluid communication with the first passage, and a plurality of impingement holes in fluid communication with the second passage.

In a further embodiment according to any of the foregoing embodiments, the bleed opening is larger than each of the plurality of impingement holes.

In a further embodiment according to any of the foregoing embodiments, the first baffle and the first cavity have a substantially similar cross section, and the second baffle and the second cavity have a substantially similar cross section.

In a further embodiment according to any of the foregoing embodiments, the first baffle includes a rib-interfacing portion, a first curved portion extending from the rib-interfacing portion, and a second curved portion extending from the rib-interfacing portion.

In a further embodiment according to any of the foregoing embodiments, the first baffle abuts the rib.

In a further embodiment according to any of the foregoing embodiments, the second baffle abuts the rib.

In a further embodiment according to any of the foregoing embodiments, the central portion extends from a base of the airfoil to a tip of the airfoil and is free of any openings extending from the first cavity to the second cavity.

A gas turbine engine according to an example of the present disclosure includes a turbine section. At least one vane within the turbine section includes a first cavity, a second cavity, and a rib extending from a suction sidewall to a pressure sidewall and separating the first cavity from the second cavity. The rib includes a central portion, a first edge portion extending from the pressure sidewall to the central portion, and a second edge portion extending from the suction sidewall to the central portion. The rib defines one or more communication openings from the first cavity to the second cavity in the first or second edge portion.

In a further embodiment according to any of the foregoing embodiments, a first baffle is disposed in the first cavity and defines a first interior channel and a first outer channel between the first baffle and an inner surface of the first cavity. A second baffle is disposed in the second cavity and defines a second interior channel and a second outer channel between the second baffle and an inner surface of the second cavity.

In a further embodiment according to any of the foregoing embodiments, the first baffle and the pressure sidewall bound a first passage, and the second baffle and the pressure sidewall bound a pressure-sidewall passage, and one or more communication openings are in the first edge portion and extend from the first passage to the pressure-sidewall passage.

In a further embodiment according to any of the foregoing embodiments, the first outer channel includes the first passage and a second passage, and a partition separates the first passage from the second passage.

In a further embodiment according to any of the foregoing embodiments, the central portion extends from a base of the airfoil to a tip of the airfoil and is free of any openings extending from the first cavity to the second cavity.

In a further embodiment according to any of the foregoing embodiments, the first baffle abuts the rib.

In a further embodiment according to any of the foregoing embodiments, the first baffle abuts the rib.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
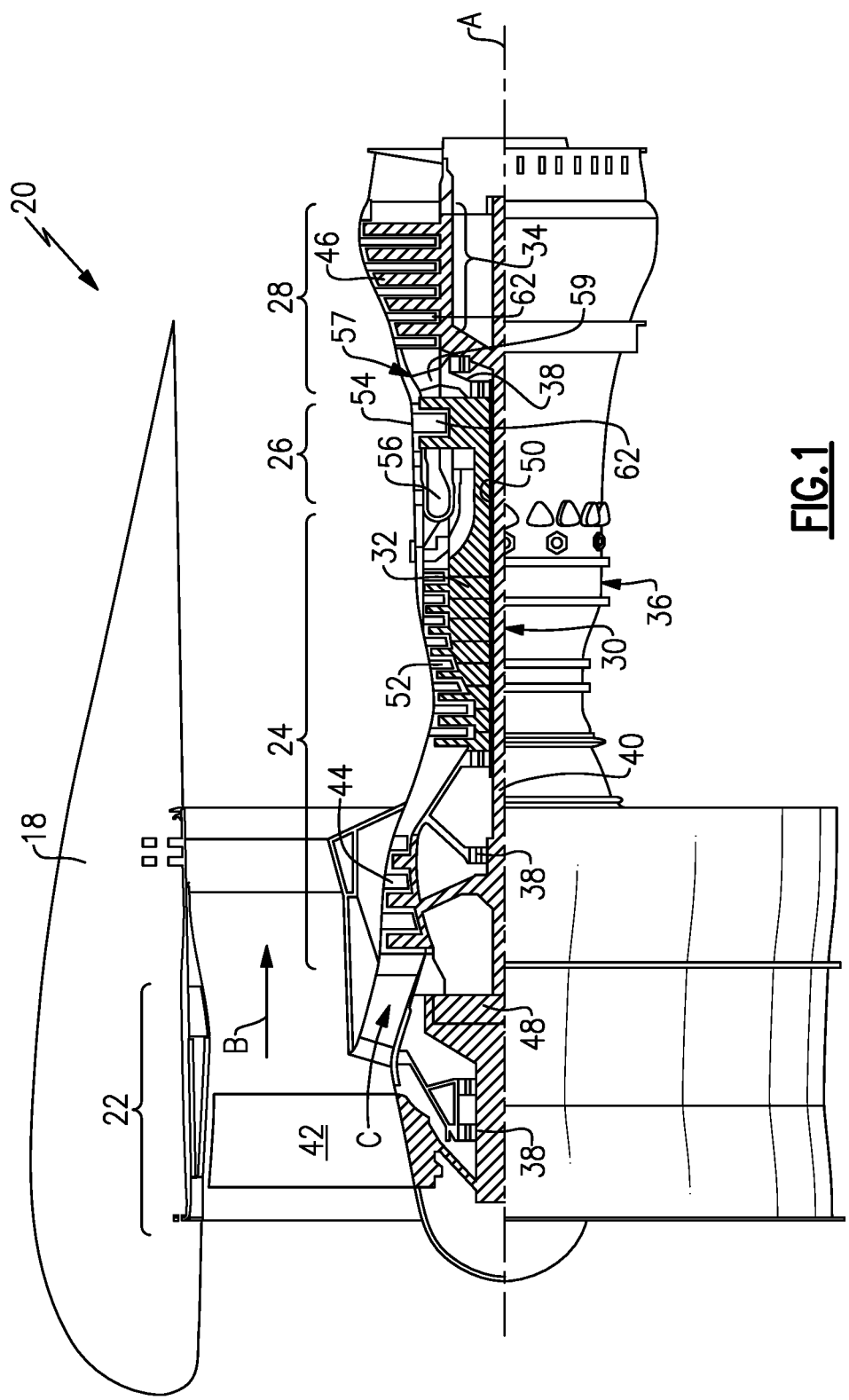
FIG. 1 is a schematic view of an example gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmenter section (not shown) among other systems or features. The fan section 22 drives air along a bypass flow path B in a bypass duct defined within a nacelle 18, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction read [(Tram ° R)/(518.7° R)]^0.5. The "Low corrected fan tip speed" as disclosed herein according to one non-limiting embodiment is less than about 1150 ft/second (350.5 meters/second).

The example turbine engine 20 includes vanes 62 disposed within the turbine section 28. The vanes 62 includes features for cooling so that it may operate with a predefined operational life within the extreme temperatures.

Figure 2:
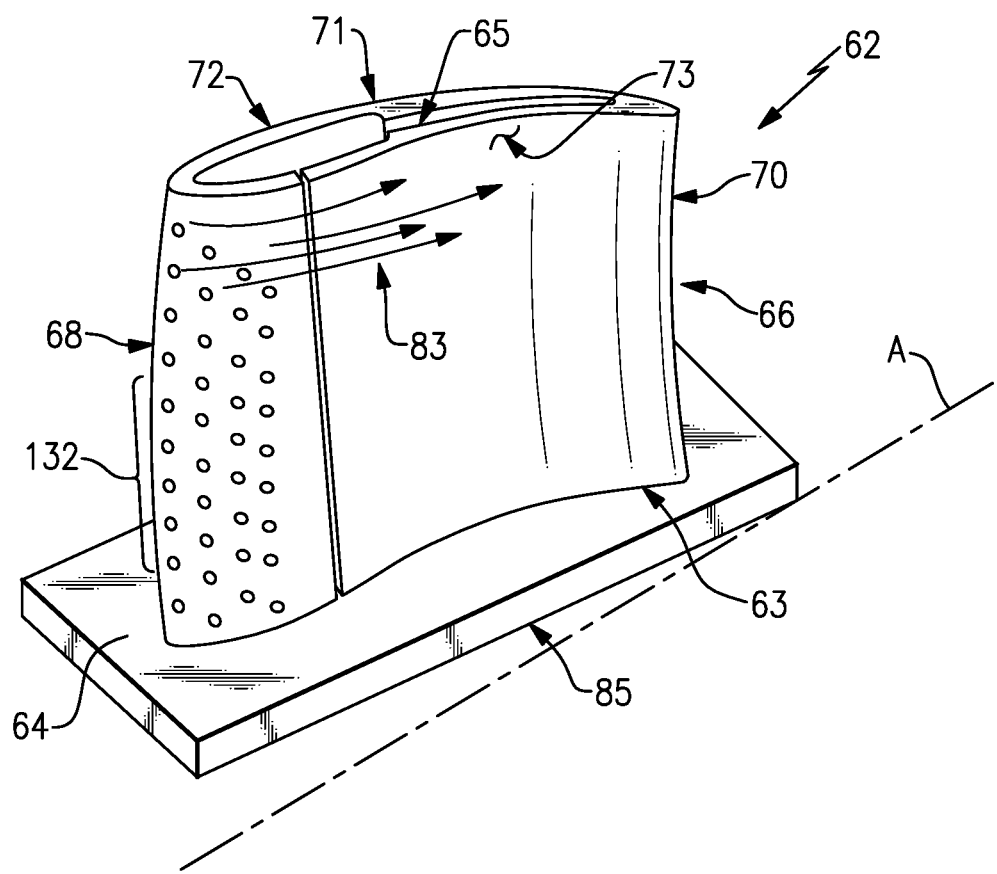
FIG. 2 is a perspective view of a turbine vane.
Figure 3:
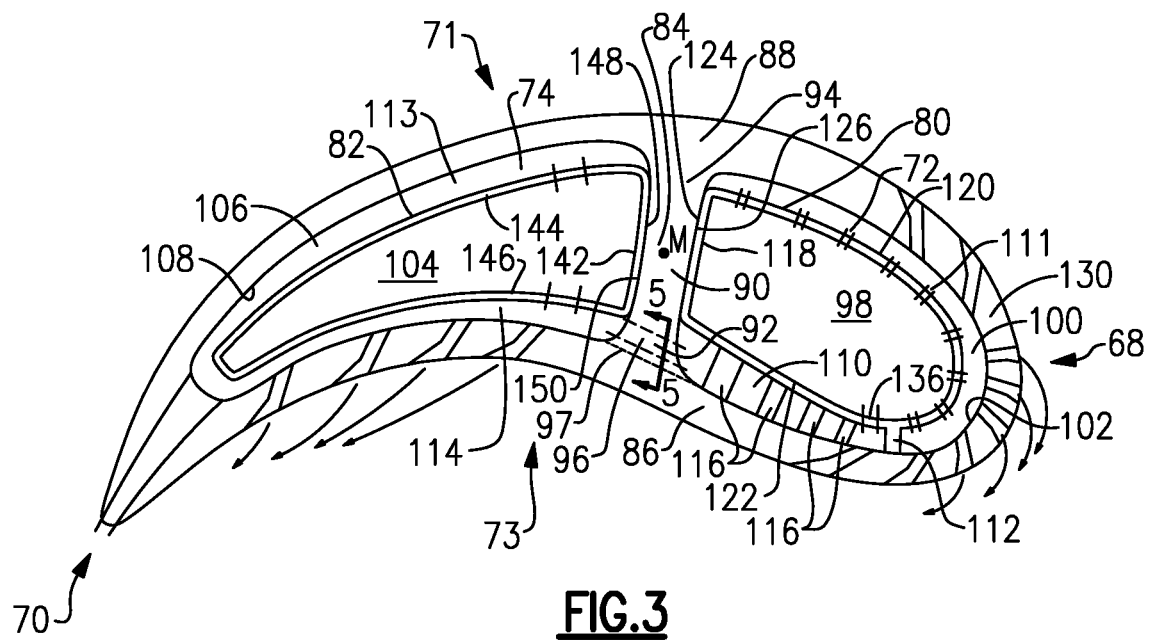
FIG. 3 is a cross-section of an example turbine vane.
Figure 4:
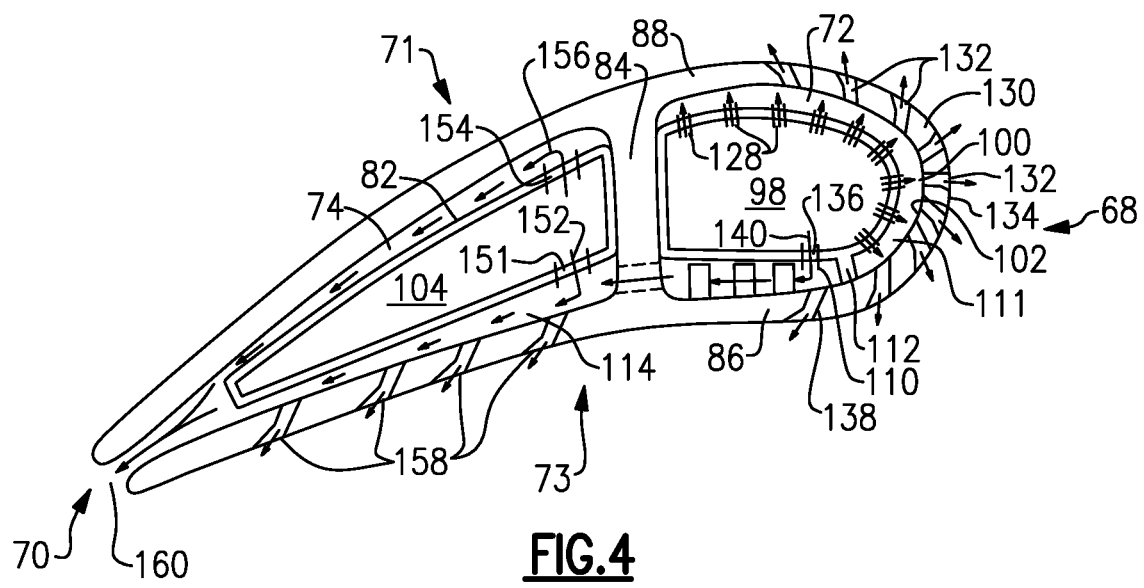
FIG. 4 is a cross-section of the example turbine vane of FIG. 3.

Referring to FIGS. 2-4 with continued reference to FIG. 1, the example turbine vane 62 extends radially away from the engine axis A from a base 63 at a platform 64 to a tip 65. The disclosed example turbine vane 62 includes an airfoil portion 66 with a leading edge 68, a trailing edge 70, a pressure side 73 and a suction side 71. The airfoil portion 66 may include a plurality of film cooling holes 132 through which a cooling film airflow 83 is communicated to maintain the vane 62 within a predefined temperature range. The predefined temperature range corresponds to material capabilities and the amount of cooling air provided. It should be appreciated that, although a vane 62 is disclosed and explained by way of example, turbine rotors and other airfoils that require cooling would benefit from the disclosures herein.

The airfoil portion 66 defines a first or leading edge cavity 72 proximate the leading edge 68 and a second or trailing edge cavity 74 proximate the trailing edge 70. The first cavity 72 includes a baffle 80, and the second cavity 74 includes a baffle 82. In this example, the baffle 80 within the leading edge cavity 72 is a separate structure supported within the cavity 72 and spaced apart from an inner surface 102 of the cavity 72. The baffle 82 within the trailing edge cavity 74 is a separate structure supported within the cavity 74 and spaced apart from an inner surface 108 of the cavity 74. Each of the baffle 80 and baffle 82 direct cooling airflow supplied to each of the corresponding cavities 72, 74. In some examples, the baffles 80, 82 are formed from a metallic alloy, but other materials are contemplated within the scope of this disclosure.

The first cavity 72 and the second cavity 74 are separated by a rib 84 extending from a pressure sidewall 86 to a suction sidewall 88. The rib 84 includes a central portion 90, a first edge portion 92 extending from the pressure sidewall 86 to the central portion 90, and a second edge portion 94 extending from the suction sidewall 88 to the central portion 90. In the example, each of the central portion 90, first edge portion 92, and second edge portion 94 extend from the base 63 to the tip 65 of the airfoil portion 66. The central portion 90 includes a midpoint M of the rib between the pressure sidewall 86 and suction sidewall 88. The rib 84 defines one or more communication openings 96 in the first edge portion 92. In an alternative embodiment, the rib 84 defines one or more communication openings 96 in the second edge portion 94 extending from the first cavity 72 to the second cavity 74. The central portion 90 may be free of any communication openings between the cavity 72 and the cavity 74.

The first baffle 80 defines an interior channel 98 and an outer channel 100 between the first baffle 80 and an inner surface 102 of the first cavity 72. The second baffle 82 defines a second interior channel 104 and a second outer channel 106 between the second baffle 82 and an inner surface 108 of the second cavity 74.

The first baffle 80 and the inner surface 102 of the cavity 72 at the pressure sidewall 86 bound a first passage 110, which is part of the outer channel 100. The first passage 110 may be fluidly separated from a second passage 111 of the outer channel 100 by a partition 112, such that the outer channel 100 includes the passages 110, 111. The baffle 82 separates the outer channel 106 into a suction side passage 113 and a pressure-side passage 114. The second baffle 82 and the inner surface 108 of the second cavity 74 at the pressure sidewall 86 bound the pressure-side passage 114. In the example, the one or more communication openings 96 are in the first edge portion 92 and extend from the first passage 110 to the pressure-side passage 114.

Figure 5A:
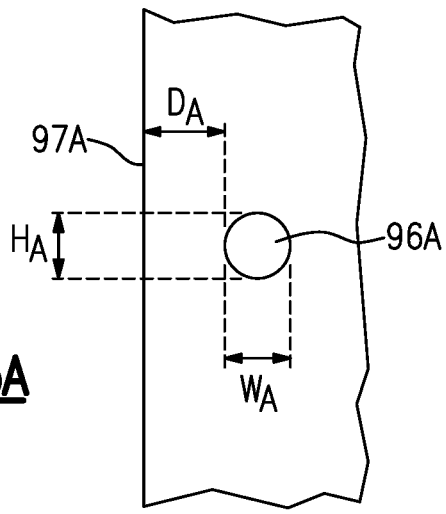
FIG. 5A is a schematic view of a first example communication opening.
Figure 5B:
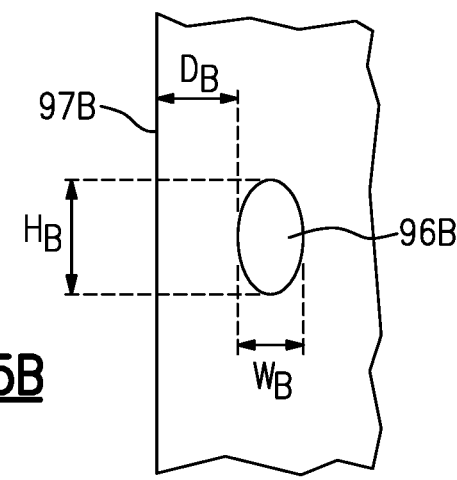
FIG. 5B is a schematic view of a second example communication opening.
Figure 5C:
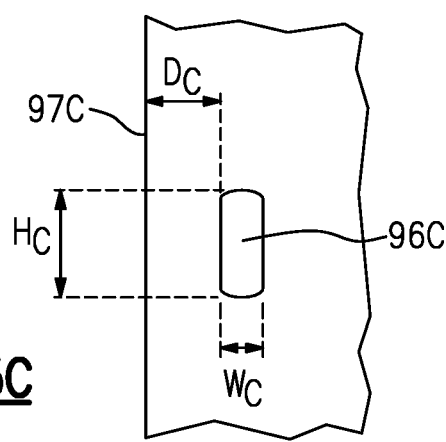
FIG. 5C is a schematic view of a third example communication opening.

In some examples, as shown schematically in FIGS. 5A-5C, the communication openings 96 may be round (FIG. 5A), oval (FIG. 5B), or "racetrack" (FIG. 5C) in shape as to not induce stress concentrations along the rib 84. As shown in FIG. 5A, the communication opening 96A is round, such that the width $W_A$ is equal to the height $H_A$ of the opening 96A. As shown in FIGS. 5B and 5C, the heights $H_B/H_C$ are greater than the widths $W_B/W_C$ and, in some examples, may be four times greater than the widths $W_B/W_C$. The widths $W_A/W_B/W_C$ may be equal to the distances $D_A/D_B/D_C$ between the openings 96A/96B/96C and a reference plane 97 (see FIG. 3) extending from a point at the surface 102 of the first passage 110 to a point at the surface 108 of the passage 114 and substantially parallel to the opening 96.

The first passage 110 and second passage 114 may include a plurality of flow disrupting features 116 (shown in first passage 110 in the example). The example flow disrupting features 116 may be of any structure understood to disrupt flow and increase surface area to improve heat transfer. In one example embodiment, the flow disrupting features 116 disrupt flow and increase surface area to improve heat transfer. In one example embodiment, the flow disrupting features 116 are pedestals that extend from the inner surface 102 of the cavity 72 at the pressure sidewall 86 towards the baffle 80. In another example, the pedestals are part of the baffle 80 and extend outward toward the inner surface 102. Moreover, instead of the disclosed example flow pedestals other shapes such as ribs, dimples or other shapes that improve heat transfer could be utilized and are within the contemplation of this disclosure. In some examples, the flow disrupting features 116 are configured to increase the turbulence of fluid flowing through the first passage 110 and through the communication openings 96 to the pressure-side passage 114.

In the example, the first baffle 80 is geometrically complementary to the first cavity 72, such that the first baffle 80 and first cavity 72 have substantially similar cross sections. The gap between the surface 102 of the cavity 72 and the baffle 80 is maintained by protruding features from the surface 102 in some examples, maintaining a roughly uniform standoff distance between the surface 102 and the baffle 80 at the passages 110 and 111. The first baffle 80 includes a rib-interfacing portion 118, a first curved portion 120 extending from the rib-interfacing portion 118, and a second curved portion 122 extending from the rib-interfacing portion 118. The rib-interfacing portion 118 includes a vertically extending face 124 configured to interface with a vertically extending face 126 of the rib 84. The face 124 and the face 126 are configured to abut to prevent air flowing through passage 110 from flowing along the rib 84 to the passage 111. In the example, the central portion 90 extends the length of the rib-interfacing portion 118 and the central portion 90 is free of any communication openings between the cavity 72 and the cavity 74.

In the example, the second baffle 82 is geometrically complementary to the second cavity 74, such that the second baffle 82 and second cavity 74 have substantially similar cross sections. The second baffle 82 includes a rib-interfacing portion 142, a first curved portion 144 extending from the rib-interfacing portion 142, and a second curved portion 146 extending from the rib-interfacing portion 142. The rib-interfacing portion 142 includes a vertically extending face 148 configured to interface with a vertically extending face 150 of the rib 84. The face 148 and the face 150 are configured to abut to prevent air flowing through the communication opening 96 from flowing along the rib 84 to the suction side passage 113.

Figure 7:
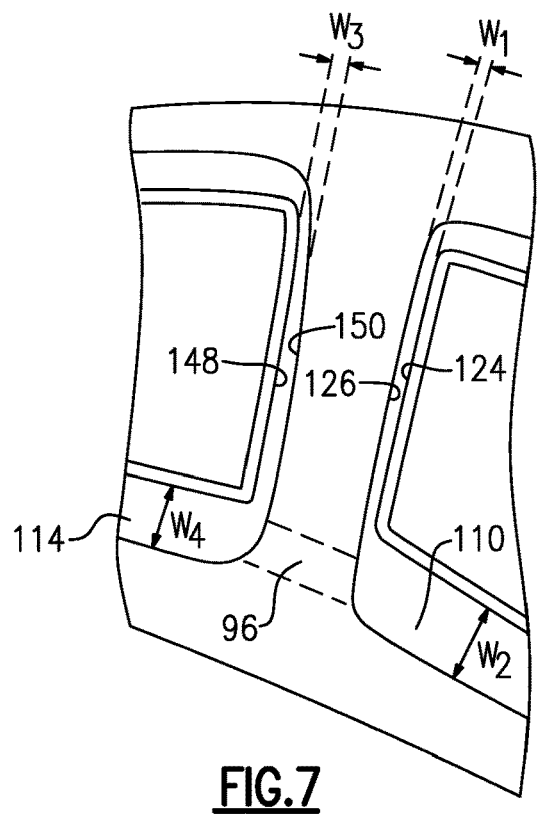
FIG. 7 is a sectional view of another example turbine vane.

In another example (see FIG. 7), the face 124 and the face 126 substantially abut, such that the average width w1 between the face 124 and the face 126 is less than 10% of the average width w2 of the first passage 110. Alternatively or additionally, the face 148 and the face 150 substantially abut, such that the average width w3 between the face 148 and the face 150 is less than 10% of the average width w4 of the first passage 110.

FIG. 4 illustrates an example cooling airflow 85 (see FIG. 2) through the example vane 62. The baffle 80 receives cooling airflow 85 within an interior channel 98 and disperses that cooling air against the inner surface 102 of the cavity 72. The baffle 80 includes a plurality of impingement openings 128 through which air flows as schematically indicated to impinge against the inner surface 102 of the cavity 72. Impingement of cooling air flow cools against the inner surface 102 of the cavity 72 to keep it within a desired temperature range.

Airflow through the impingement openings 128 into the second passage 111 impinges on the inner surface 102 of the cavity 72 to cool the wall 130 of the airfoil portion 66 adjacent the cavity 72. Air then flows through the film cooling holes 132 that injects the cooling air into the gas flow path along the outer surface 134 of the vane 62.

The amount of cooling flow required by the vane 62 is determined by the operating conditions of the airfoil 66 and the metal temperature targets required for the airfoil 66 to meet its life requirements. Cooling flow is metered by various cooling holes, and the impingement cooling pattern in the baffles 80, 82 is configured to focus impingement cooling air locally to achieve metal temperature targets. Moreover, the airflow into the baffles 80, 82 and against the inner surfaces 102, 108 must maintain a pressure above that encountered outside of the vane 62 so that the exhaust gas flow is not ingested into the cavities 72, 74. The pressure differential between the core airflow outside of the vanes 62 and the cooling airflow within the vane 62 is referred to as back flow margin (BFM). In some locations on the vane 62, the BFM is relatively small and therefore variations in pressure along the surface of the vane 62 may vary such that pressure loss is to be minimized in order to maintain higher pressure within the vane 62. It may be desirable in some applications to minimize cooling air flow rates to maximize overall engine efficiency. The example vane 62 includes features for maintaining BFM within acceptable predefined ranges while reducing the amount of airflow required to maintain the vane 62 within desired temperature ranges.

The example baffle 80 defines an outer channel 100 between the inner surface 102 and the baffle 80 that increases heat transfer coefficients without significantly impacting or requiring complex assembly or manufacturing techniques. The external pressures on the turbine vane 62 differ between the suction side 71, pressure side 73, leading edge 68 and trailing edge 70. A lower external pressure is typically encountered on the suction side 71 relative to pressures at the leading edge 68, pressure side 73 and at the trailing edge 70. The lower pressures along the suction side 71 enable more airflow through openings compared to airflow through similar sized openings in other higher pressure regions such as at the leading edge 68. The increased flow on one side of the vane 62 as compared to flows in other regions of the vane 62 can reduce efficiency.

In this example, the first passage 110 does not include impingement cooling holes in the baffle 80 but instead includes a bleed opening 136 in the baffle 80. In some examples, the bleed cooling opening 136 may be larger than each of the impingement openings 128. The impingement openings 128 are smaller in order to create higher velocity impingement cooling jets, which incur a larger pressure drop than the flow through the larger bleed opening 136, which is a slower flow of larger volume. In some examples, the bleed opening 136 is a single bleed opening. The sizes and number of impingement openings 128 and bleed opening 136 may be tailored to achieve desired airflows. The first passage 110 includes a plurality of flow disrupting features 116 and exhausts air through an opening 138 in the pressure sidewall 86 and/or the one or more communication openings 96 to the second cavity 74.

In the disclosed example, the flow disrupting features 116 extend from the inner surface 102 towards the baffle 80 to create turbulent flow that improves heat transfer. In the first passage 110, heat transfer is provided by flow through the passage 110 along the inner surface 102 and not impingement against the inner surface 102. Airflow, schematically shown at 140 into the first passage 110 flows through the bleed opening 136 across the flow disrupting features 116 and out the communication opening 96 to the second cavity 74. Some airflow 140 may flow out the opening 138 before reaching the flow disrupting features 116. Airflow exhausted through the opening 138 flows along an outer surface 134 of the vane 62 to provide film cooling function of the vane 62.

Airflow exiting though communication openings 96 is directed to the pressure side passage 114, and the baffle 82 is arranged to prevent the airflow from flowing along the rib 84 to the suction side passage 113. The interior channel 104 of the baffle 82 receives a cooling airflow 85, and the baffle 82 includes a first bleed opening 151 for the airflow shown schematically at 152 to exit into the pressure-side passage 114. The baffle 82 includes a second bleed opening 154 for airflow shown schematically at 156 to exit into the pressure-side passage 113.

The example passage 114 therefore receives airflow 140 exiting the interior channel 98 of the baffle 80 through bleed opening 136 and flowing through the passage 110 and communication openings 96, as well as airflow 152 exiting the interior channel 104 of the baffle 82 through bleed opening 151. The airflow in passage 114 may then exit through film cooling openings 158 and trailing edge exit openings 160. The film cooling openings 158 are configured to provide film cooling to the pressure sidewall 86.

Airflow flowing at 156 out of the bleed opening 154 flows through the passage 113 and out of the trailing edge exit openings 160. The suction sidewall 88 at the cavity 74 may be free of film cooling openings.

The flow obstructer 112 enables the baffle 80 to be utilized to provide different flow characteristics for localized portions of the vane 62 to compensate for the variations in BFM between the suction side 71, leading edge 78 and pressure side 73. The pressures and air flows in the first passage 110 can be controlled independent of air flow and pressures in the second passage 111 by sizing the impingement openings 128 and bleed opening 136.

Figure 6:
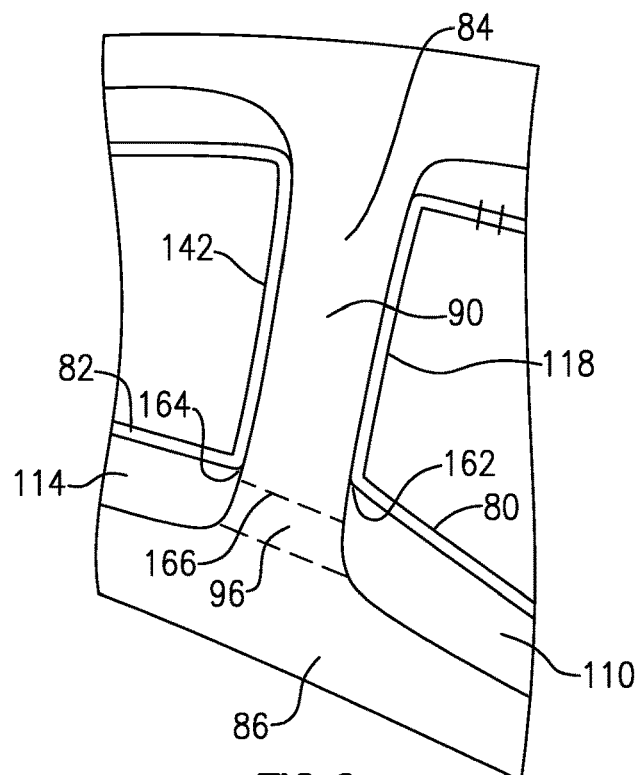
FIG. 6 is a sectional view of the example turbine vane of FIG. 3.

As illustrated in FIG. 6, for direct flow through the communication openings 96 from the passage 110 to the passage 114, the openings 96 are biased toward the sidewall of the airfoil portion 66, this example being the pressure sidewall 86, from the center portion 90 of the rib 84. In the example, the innermost point 166 of the communication opening 96 is closer to the outer surface 134 of the pressure sidewall 86 than one or both of an outermost point 162 of the baffle 80 at the rib-interfacing portion 118 and an outermost point 164 of the baffle 82 at the rib-interfacing portion 142.

Figure 8:
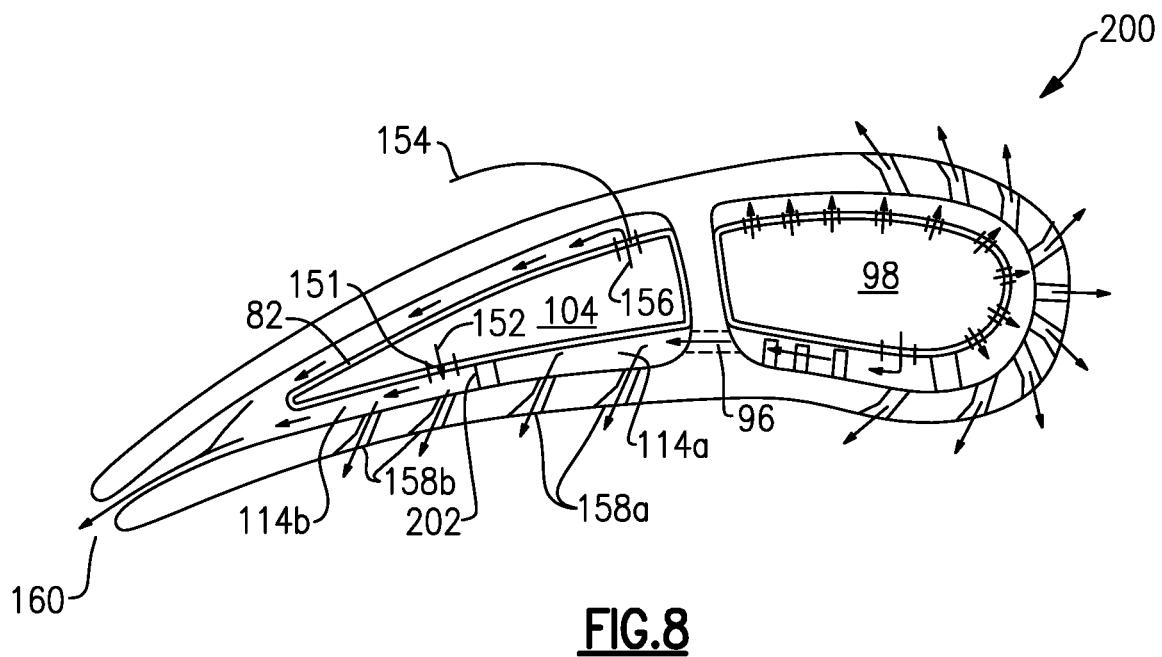
FIG. 8 is a cross-section of yet another turbine vane embodiment.

FIG. 8 illustrates a cross section of another example turbine vane 200. A partition 202 is provided in the passage 114 to fluidly separate the passage 114 into a first section 114a and a second section 114b. The section 114a receives airflow from the passage 110 through the communication openings 96 and does not receive airflow from the interior channel 104 of the baffle 82. The airflow in section 114a exits through film cooling openings 158a. The section 114b receives the airflow 152 from the interior channel 104 through the opening 151, which exits through the film cooling openings 158b and trailing edge exit openings 160.

The film cooling openings 158a and 158b are configured to provide film cooling to the pressure sidewall 86. The film cooling openings 158a are nearer the leading edge than the film cooling openings 158b. In some examples, the airflow 152 may have a higher pressure than the airflow through the communication openings 96, which could result a reversal in flow. The partition 202 allows the cooling air from interior channel 98a to be focused on the openings 158a and the cooling air from the channel 104 to be focused on the film cooling openings 158b, preventing the airflow 152 from flowing toward the communication openings 96.

Figure 9:
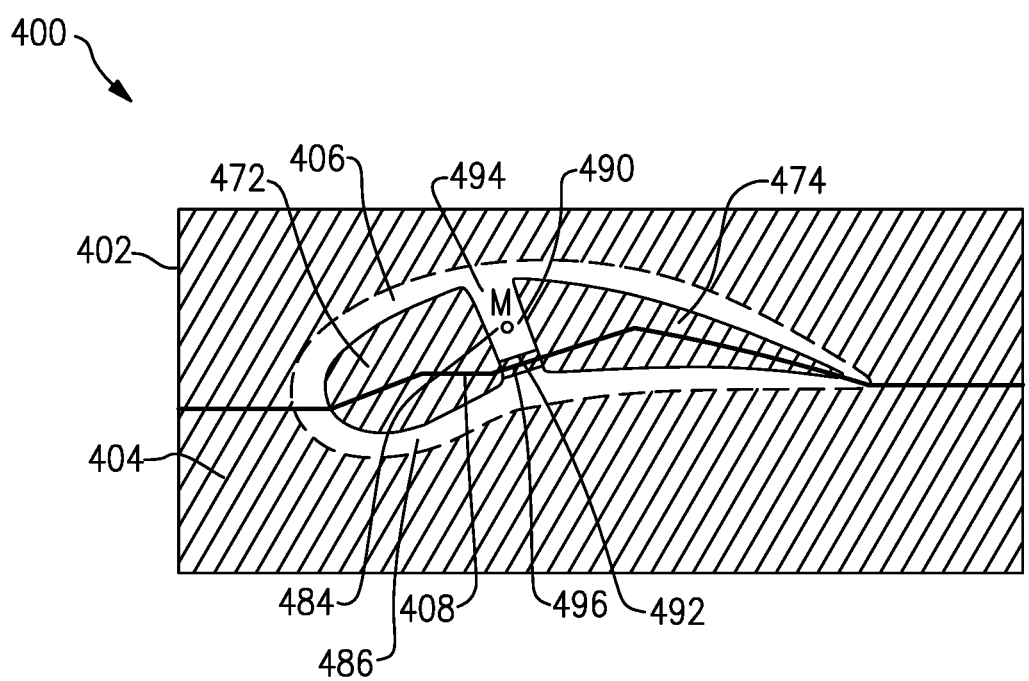
FIG. 9 illustrates an example casting system.

FIG. 9 illustrates an example casting system 400 that may be used to manufacture one or more of the example airfoil sections disclosed herein, with like reference numerals representing like features. Other manufacturing methods are contemplated. An upper clam shell 402 and a lower clam shell 404 combine to form a cavity 406 for receiving a wax for forming a wax pattern providing a contour for forming the cast part, such as in a lost-wax casting or investment casting process.

A first ceramic core 472 and a second ceramic core 474 are provided within the cavity 406 to create cavities within the airfoil section. The cores 472 and 474 are spaced apart by a rib-forming portion 484. The rib-forming portion 484 includes a central portion 490, a first edge portion 492 extending from the pressure sidewall portion 486 to the central portion 490, and a second edge portion 494 extending from the suction sidewall portion 488 to the central portion 490. One or more ceramic connecting members 496 lie between the core 472 and core 474 for creating cast in communication openings between the cavities in the cast part. The members 496 may be in the first edge portion 492 or the second edge portion 494. The parting line 408, the separation line between the shells 402, 404, runs through the first edge portion 492 or the second edge portion 494 that includes the one or more connecting members 496. The connecting members 496 can therefore have portions on both sides of the parting line 408 for creation of communication openings.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

What is claimed is:

1. An airfoil for a gas turbine engine comprising:
   a first cavity;
   a second cavity;
   a rib extending from a suction sidewall to a pressure sidewall and separating the first cavity from the second cavity, wherein the rib includes a central portion, a first edge portion extending from the pressure sidewall to the central portion, and a second edge portion extending from the suction sidewall to the central portion, the rib defining one or more communication openings from the first cavity to the second cavity in the first edge portion; and
   a first baffle disposed in the first cavity and abutting the rib and defining an interior channel and an outer channel between the first baffle and an inner surface of the first cavity, wherein the outer channel includes the first passage and a second passage fluidly separated by a partition; and
   a second baffle disposed in the second cavity and abutting the rib and defining a second interior channel and a second outer channel between the second baffle and an inner surface of the second cavity, wherein the first baffle and the pressure-sidewall bound a first passage, and the second baffle and the pressure sidewall bound a pressure-sidewall passage, and the one or more communication openings extend from the first passage to the pressure-sidewall passage.

2. The airfoil for a gas turbine engine as recited in claim 1, wherein the first baffle provides a bleed opening in fluid communication with the first passage, and a plurality of impingement holes in fluid communication with the second passage.

3. The airfoil for a gas turbine engine as recited in claim 2, wherein the bleed opening is larger than each of the plurality of impingement holes.

4. The airfoil for a gas turbine engine as recited in claim 1, wherein the first baffle includes a flat rib-interfacing portion, a first curved portion extending from the flat rib-interfacing portion, and a second curved portion extending from the flat rib-interfacing portion, and the flat rib-interfacing portion abuts the rib.

5. The airfoil for a gas turbine engine as recited in claim 1, wherein the central portion extends from a base of the airfoil to a tip of the airfoil and is free of any openings extending from the first cavity to the second cavity.

6. The airfoil for a gas turbine engine as recited in claim 1, wherein the second baffle provides a suction sidewall passage between the second baffle and the suction sidewall, and the second baffle abuts the rib to prevent air flowing through the one or more communication openings from flowing along the to the suction sidewall passage.

7. The airfoil for a gas turbine engine as recited in claim 6, wherein the pressure sidewall includes a plurality of film cooling openings extending from the pressure sidewall passage.

8. The airfoil for a gas turbine engine as recited in claim 7, comprising a partition in the pressure sidewall passage fluidly separating the pressure sidewall passage into a first pressure sidewall passage section and a second pressure sidewall passage section.

9. The airfoil for a gas turbine engine as recited in claim 8, wherein the second baffle includes a bleed opening in communication with the second pressure sidewall passage section.

10. The airfoil for a gas turbine engine as recited in claim 9, wherein the second baffle does not include a bleed opening in communication with the first pressure sidewall passage section, and the first pressure sidewall passage section is in fluid communication with the first passage through the one or more communication openings.

11. The airfoil for a gas turbine engine as recited in claim 1, wherein the first baffle and the second baffle do not abut the first edge portion.

12. The airfoil for a gas turbine engine in claim 1, wherein the airfoil is a vane airfoil.

13. A gas turbine engine comprising:
a turbine section;
at least one vane within the turbine section including
- a first cavity;
- a second cavity; and
- a rib extending from a suction sidewall to a pressure sidewall and separating the first cavity from the second cavity, wherein the rib includes a central portion, a first edge portion extending from the pressure sidewall to the central portion, and a second edge portion extending from the suction sidewall to the central portion, the rib defining one or more communication openings from the first cavity to the second cavity in the first or second edge portion;
- a first baffle disposed in the first cavity and abutting the rib and defining a first interior channel and a first outer channel between the first baffle and an inner surface of the first cavity, wherein the first outer channel includes the first passage and a second passage, and a partition separates the first passage from the second passage, and
- a second baffle disposed in the second cavity and abutting the rib and defining a second interior channel and a second outer channel between the second baffle and an inner surface of the second cavity.

14. The gas turbine engine as recited in claim 13, wherein the first baffle and the pressure sidewall bound a first passage, and the second baffle and the pressure sidewall bound a pressure-sidewall passage, and the one or more communication openings are in the first edge portion and extend from the first passage to the pressure-sidewall passage.

15. The gas turbine engine as recited in claim 13, wherein the central portion extends from a base of the airfoil to a tip of the airfoil and is free of any openings extending from the first cavity to the second cavity.

16. The gas turbine engine as recited in claim 13, wherein the first passage includes a plurality of flow disruptors, and a bleed opening extends from the first passage through the pressure sidewall to provide film cooling for the pressure sidewall.

17. The gas turbine engine as recited in claim 16, wherein the bleed opening is larger than each of a plurality of impingement holes in fluid communication with the second passage.

18. The gas turbine engine as recited in claim 13, wherein the rib defines the one or more communication openings from the first cavity to the second cavity in the first edge portion, and the first baffle and the second baffle do not abut the first edge portion.

* * * * *